UNITED STATES PATENT OFFICE.

HENRY GOLDMANN, OF NEW YORK, N. Y.

IMPROVEMENT IN TREATING COTTON-SEED OIL TO RENDER IT DRYING.

Specification forming part of Letters Patent No. 141,503, dated August 5, 1873; application filed May 17, 1873.

*To all whom it may concern:*

Be it known that I, Dr. HENRY GOLDMANN, of the city, county, and State of New York, have invented a new and Improved Process for Converting Cotton-Seed Oil into a Drying-Oil for Paints, of which the following is a specification:

My invention consists of a chemical treatment of cotton-seed oil, to prepare it so that it can be used in the arts as a substitute for linseed-oil.

I dissolve five pounds of bichromate of potassa in twenty gallons of water, heat to boiling-point, carry into this one hundred gallons of clear cotton-seed oil, agitating and mixing strongly for two hours; after twenty-four hours the oil is drawn off into another vessel, and here I add gradually, under constant strong agitation, five pounds of aqua regia, freshly prepared, diluted with twenty gallons of water, continuing the agitation for two hours; then allow twenty-four hours for settling. The oil is then again drawn off into another vessel, where it is mixed with five pounds oil of vitriol, diluted with ten gallons of water under agitation for two hours; then I allow it to stand till clear enough for use.

Having thus described my invention, I claim as new and desire to secure by Letters Patent—

The process for converting cotton-seed oil into a drying-oil, substantially as herein described.

HENRY GOLDMANN.

Witnesses:
    T. B. MOSHER,
    ALEX. F. ROBERTS.